(12) United States Patent
Kaneko et al.

(10) Patent No.: US 9,051,485 B2
(45) Date of Patent: *Jun. 9, 2015

(54) INKJET INK AND INKJET RECORDING METHOD

(75) Inventors: Manabu Kaneko, Hachioji (JP); Hidenobu Ohya, Hachioji (JP); Naoko Nakajima, Hino (JP)

(73) Assignee: KONICA MINOLTA, INC. (JP)

( * ) Notice: Subject to any disclaimer, the term of this patent is extended or adjusted under 35 U.S.C. 154(b) by 60 days.

This patent is subject to a terminal disclaimer.

(21) Appl. No.: 13/641,532

(22) PCT Filed: Apr. 8, 2011

(86) PCT No.: PCT/JP2011/058872
§ 371 (c)(1),
(2), (4) Date: Oct. 16, 2012

(87) PCT Pub. No.: WO2011/136000
PCT Pub. Date: Nov. 3, 2011

(65) Prior Publication Data
US 2013/0038659 A1 Feb. 14, 2013

(30) Foreign Application Priority Data
Apr. 27, 2010 (JP) ................. 2010-101858

(51) Int. Cl.
C09D 11/322 (2014.01)
B41M 5/00 (2006.01)
B41M 7/00 (2006.01)
C09D 11/106 (2014.01)

(52) U.S. Cl.
CPC ........... *C09D 11/322* (2013.01); *B41M 5/0011* (2013.01); *B41M 5/0023* (2013.01); *B41M 7/009* (2013.01); *C09D 11/106* (2013.01)

(58) Field of Classification Search
USPC .......................................... 347/100; 523/160
See application file for complete search history.

(56) References Cited

U.S. PATENT DOCUMENTS

| | | | |
|---|---|---|---|
| 7,629,395 B2 * | 12/2009 | Nishiguchi et al. ........... | 523/160 |
| 2004/0048973 A1 * | 3/2004 | Akutsu et al. ................. | 524/543 |
| 2007/0287770 A1 * | 12/2007 | Nishiguchi et al. ........... | 523/160 |

FOREIGN PATENT DOCUMENTS

| | | |
|---|---|---|
| JP | 2000-191974 A | 7/2000 |
| JP | 2003-192956 A | 7/2003 |
| JP | 2003-292838 A | 10/2003 |
| JP | 2004-26946 A | 1/2004 |
| JP | 2004-99800 A | 4/2004 |
| JP | 2005-82751 A | 3/2005 |
| JP | 2006-8797 A | 1/2006 |
| JP | 2006-249393 A | 9/2006 |
| JP | 2008-138064 A | 6/2008 |
| JP | 2008-189793 A | 8/2008 |
| JP | 2008-208153 A | 9/2008 |
| JP | 2011-56690 A | 3/2011 |
| JP | 2011-74336 A | 4/2011 |
| JP | 2011-94082 A | 5/2011 |
| WO | 2009/08222 A1 | 1/2009 |
| WO | 2010/122994 A1 | 10/2010 |
| WO | 2010/123064 A1 | 10/2010 |

OTHER PUBLICATIONS

International Search Report for International Application No. PCT/JP2011/058872 mailing date of Jul. 12, 2011 with English translation.

* cited by examiner

Primary Examiner — Matthew Luu
Assistant Examiner — Lily Kemathe
(74) Attorney, Agent, or Firm — Cantor Colburn LLP

(57) ABSTRACT

Provided is an inkjet ink which can form high-quality images with high abrasion resistance and adhesiveness on a non-absorptive recording medium and which exhibits high ejection properties and excellent storage stability. Also provided is an inkjet recording method. An inkjet ink which comprises water, a pigment, a water-soluble resin, a water-soluble or Panic solvent and a surfactant, characterized in that: the water-soluble resin comprises a water-soluble resin consisting of a copolymer resin which has an acid value of 50 to 130 mgKOH/g, a glass transition temperature (Tg) of 30 to 100° C., and a weight-average molecular weight (Mw) of 20,000 to 80,000, said copolymer resin being a resin which is synthesized from a monomer component that comprises methyl methacrylate, an alkyl acrylate or methacrylate, and an acid monomer and in which the total mass of methyl methacrylate and the alkyl acrylate or methacrylate is 80 to 95% relative to the total mass of all of the monomers constituting the copolymer resin; and the surfactant comprises a fluorochemical surfactant and a polyoxyethylene alkyl ether.

8 Claims, No Drawings

INKJET INK AND INKJET RECORDING METHOD

CROSS REFERENCE TO RELATED APPLICATIONS

This is a U.S. national stage of application No. PCT/JP2011/058872, filed on 8 Apr. 2011. Priority under 35 U.S.C. §119(a) and 35 U.S.C. §365(b) is claimed from Japanese Application No. 2010-101858, filed 27 Apr. 2010, the disclosure of which are also incorporated herein by reference.

FIELD OF THE INVENTION

The present invention relates to a water-based inkjet ink and an inkjet recording method, specifically relates to an inkjet ink and an inkjet recording method which can be recorded on a non-absorptive recording medium (hereinafter, also referred to as recording medium).

TECHNICAL BACKGROUND

There have been developed inkjet inks for industrial use which can be printed directly on a non-absorptive medium such as a polyvinylchloride sheet. Examples of these inkjet inks are cited as: a solvent ink in which an organic solvent is used as a vehicle of an ink; and a UV ink containing a polymerizable monomer as a primary component of an ink. A solvent ink is dried by evaporating its solvent to the air, as a result, a solvent ink has a problem of emitting a large amount of VOC, which becomes a social problem in recent years. There are other concerns for a worker about an odor or an effect for the safety. Therefore, it is required to provide equipment for making sufficient ventilation. A UV ink is made harden immediately after printing, therefore, an emission of VOC is close to zero, but many monomers to be used in the ink may have problem of skin sensitization. Further, there are requirement of incorporating an expensive UV light source into a printer, and it cannot be used for printers for every field. Moreover, when printed on a glossy type sheet, these inks cause extremely lusterless at the ink deposited portion, resulting in being difficult to have an image having excellent image quality.

In the above-described background, there has been developed an ink which can be printed also directly to a non-water absorptive recording medium, by using a water-based ink containing water as a major component which has been widely used in homes and has reduced effects on the environment.

There has been proposed a water-based ink containing a water miscible solvent selected from glycols and glycol ethers in Patent Document 1. Moreover, there has been proposed an ink containing a graft co-polymer binder which contains a hydrophobic backbone and a non-ionic and hydrophilic side-chain, wherein the graft co-polymer binder is soluble in a water-based vehicle and is not soluble in water. However, the inventors of the present invention studied the method disclosed in Patent Document 1 and found that the method disclosed in Patent Document 1 resulted in insufficient image qualities such as an ink mixing caused by coalescence of ink droplets deposited adjacently on a non-absorptive recording medium and a patchy pattern caused by gathering droplets at solid image having uniform medium density or color bleeding in multi-color printing (phenomenon in which ink droplets are mixed and a smear is produced in the boundary area of the image having a different color). Further, durability of the obtained image was also insufficient. Further, ejection failure was found when continuously using inkjet head in the method of Patent Document 1. Generally, ejection failure can be recovered by maintenance with some frequency. However, recovery through maintenance in the method of Patent Document 1 did not achieve satisfactory level.

Patent Document 2 discloses that styrene-acrylic acid copolymer is added to an ink. Copolymerizable polymer containing styrene enables to have high glossiness. However, on the other hand, it often tends to reduce abrasion resistance and adhesiveness in case of an image directly printed on a hydrophobic substrate.

Copolymer between styrene and α-methyl styrene and acidic monomer such as acrylic acid is commercially available. When employing this copolymer to an inkjet ink, it enables to have high glossiness, however, it exhibits extremely bad abrasion resistance and adhesiveness. Even though reasons are not understood in detail, it is supposed that since styrene has poor adhesiveness to substrate or the film is too hard and lack of flexibility, whereby crack or peel causes in the film because of inability to follow to distortion of soft vinyl chloride.

On the other hand, all acryl type polymers without including styrene are also commercially available, in which methyl methacrylate is used instead of styrene. However, this type without including styrene has issue which tends to decrease glossiness of an image.

Patent Document 3 discloses that water-soluble acryl resin without containing styrene is added to an ink. By using a resin coated pigment as pigment dispersion, this ink enables to have a certain extent of image durability (abrasion resistance), even when directly printed on vinyl chloride substrate. However, in the market, durability against further friction is required and this ink does not enable to have enough abrasion resistance for further friction as it is now.

Further, when these inks were stored for a long period of time, it was seen a phenomenon in some inks that the surface tension of ink rose rather than before storage. It was also found issues that ink was repelled or a dot contracts resulting in causing a hollow defect in an image, when such ink was printed on a hydrophobic substrate after prolonged storage.

PRIOR TECHNICAL DOCUMENT

Patent Document

Patent Document 1: Unexamined Japanese Patent Application Publication (hereinafter referred to as JP-A) No. 2000-44858

Patent Document 2: JP-A 2006-249393

Patent Document 3: JP-A 2008-208153

SUMMARY

Problems to be Solved by the Present Invention

In view of the foregoing, the present invention was achieved. An object of the present invention is to provide an inkjet ink which exhibits excellent abrasion resistance in an image recorded on a non-absorptive recording medium and high quality image without having no repelling or no hollow defect in the printed image, and an inkjet recording method using thereof.

Means to Solve the Problems

The above object has been attained by the following constitutions:

1. An inkjet ink which is an aqueous inkjet ink for a non-absorptive recording medium comprising water, a pigment, a water-soluble resin, a water-soluble organic solvent and a surfactant, wherein the water-soluble resin is a copolymer resin which has an acid number of not less than 50 and not more than 130 mgKOH/g, a glass transition temperature (Tg) of not less than 30 and not more than 100° C., and a weight-average molecular weight (Mw) of not less than 20,000 and not more than 80,000, and which is synthesized from a monomer component that comprises methyl methacrylate, an alkyl acrylate or alkyl methacrylate, and an acid monomer and in which the total mass of methyl methacrylate and the alkyl acrylate or alkyl methacrylate is not less than 80 and not more than 95% relative to the total mass of all of the monomers constituting the copolymer resin; and the surfactant comprises a fluorochemical surfactant and a polyoxyethylene alkyl ether.

2. The inkjet ink of item 1, wherein a carbon number of an alkyl group in the alkyl acrylate is not less than 2 and not more than 8, and the acid monomer is acrylic acid or methacrylic acid.

3. The inkjet ink of item 1, wherein a carbon number of an alkyl group in the alkyl methacrylate is not less than 2 and not more than 8, and the monomer is acrylic acid or methacrylic acid, and the acid monomer is acrylic acid or methacrylic acid.

4. The inkjet ink of any one of items 1 to 3, wherein a mass ratio of the copolymer resin based on the pigment is not less than 1 and not more than 20.

5. The inkjet ink of any one of items 1 to 4, wherein the fluorochemical surfactant is a surfactant having a straight or a branched perfluoro alkyl group or a perfluoro alkenyl group, and a carbon number of a main chain of the perfluoro alkyl group or the perfluoro alkenyl group is not less than 3 and not more than 6.

6. The inkjet ink of any one of items 1 to 5 comprising amines having a boiling point of not less than 100° C. and not more than 200° C. in an amount of not less than 0.1% by mass and not more than 1% based on the inkjet ink.

7. An inkjet recording method comprising steps of
   printing the inkjet ink of any one of items 1 to 6 on a non-absorptive recording medium which is heated at not less than 35° C. and not more than 60° C., and heat-drying a printed matter at not less than 50° C. and not more than 90° C.

Effects of the Invention

The present invention made it possible to provide an inkjet ink which exhibits excellent abrasion resistance and adhesiveness in an image recorded on a non-absorptive recording medium and high quality image without having no repelling or no hollow defect in the printed image, as well as having excellent ejection stability and ink storage and an inkjet recording method using thereof.

PREFERRED EMBODIMENT OF THE INVENTION

An optimal embodiment to practice the present invention will now be detailed.

The inventors of the present invention conducted diligent investigations about a water-based pigment ink so as to form a high-quality image having excellent abrasion resistance and adhesiveness on various recording medium such as vinyl chloride sheet for sign use or paper substrate having slow ink absorption such as printing paper as well as forming an image without having no repelling or no hollow defect in the printed image, and enhancing ejection stability and ink storage.

(Non-Absorptive Recording Medium)

The non-absorptive recording medium described above is referred to as a recording medium comprising hydrophobic resin such as vinyl chloride, PET, polypropylene, polyethylene, or polycarbonate which absorbs little water, or a recording medium such as printing paper such as coat paper which absorbs water to some extent but absorption rate is too slow to dry the water-based ink in a general inkjet printing process in an environment of ordinary temperatures and humidity, resulting in problem for drying.

(Copolymer Resin)

The copolymer resin functions as binder (fixing resin) of pigment as colorant to have adhesiveness to a non-absorptive recording medium such as vinyl chloride and also functions to enhance abrasion resistance of layer.

The copolymer resin has to function to form an image having high glossiness and high optical density. Therefore, the copolymer itself is required to have high transparency in the layer and miscibility with pigment or pigment dispersing resin.

Thus, in order to obtain a printed image having high quality and excellent abrasion resistance on various non-absorptive recording medium such as vinyl chloride sheet, it is necessary that an ink has to wet on the above-mentioned non-absorptive recording medium. The ink which can wet better on the non-absorptive recording medium, the better quality and abrasion resistance can be obtained. Therefore, resin added to the ink preferably must not degrade the wettability of the ink to the non-absorptive recording medium.

Further, it is required that an addition of resin to an ink must not deteriorate an ejection performance.

Several mechanisms are considered as a degradation of ink ejection. When an ink droplet or a dust adheres near an ejection nozzle of inkjet head and a nozzle is contaminated, it tends to cause troubles such as curved ejection of ink droplet, decreasing of an ejection amount, or impossible to ink ejection. Moreover, when adhered ink covers the whole nozzle surface, the ink droplet ejection becomes impossible. In order to avoid such a trouble, ink repellency treatment is performed by coating a fluorine based resin on the surrounding of nozzles and preventing adhering ink droplet near the nozzles.

Therefore, it is one of the conditions for good ink ejection that a resin added to the ink does not cause an ink which wets the ink repellency treatment around nozzles.

As described above, it is necessary to have enough effects to many purposes by adding a resin in the ink. Especially it needs to design and choose the resin which has opposite functions such that it is easy to wet especially the non-absorptive recording medium, and it does not wet to the ink repellency treatment around nozzles.

In view of the foregoing, the inventors of the present invention conducted diligent investigations with respect to various resins. As a result, the following was discovered, and the present invention was achieved. That is, an ink exhibits excellent abrasion resistance which has copolymer resin of alkyl acrylate type or alkyl methacrylate type with low acid value and the total mass of methyl methacrylate, the alkyl acrylate and alkyl methacrylate is not less than 80 and not more than 95% relative to the total mass of all of the monomers constituting the copolymer resin.

As is well known in the art, since acryl resin copolymerized by using monomers of acrylic ester or methacrylic ester can be selected and designed freely from extremely various type of monomers and be easily polymerized and produced in low cost, it is suitable to the present invention. Specifically, in view of satisfying various requirements for adding into ink, acryl type resin is adaptable which has a lot of flexibility to designing.

Acryl type resin available in the market includes water-dispersion type acryl emulsion and water soluble resin. Emulsion type has advantage generally to have higher molecular weight than water soluble type, resulting in forming film having enhanced strength. On the contrary, once film is dried, it cannot be dissolved into water. Therefore, since dried ink on the head cannot be eliminated by dissolving and has to be physically scraped away, thereby maintenance tends to become difficult. Therefore, the copolymer resin is preferable water soluble resin.

As for the water soluble resin, the above-mentioned copolymer resin after performing neutralization mentioned later may dissolve in 25° C. water exceeding 2% by mass, preferably dissolves in 25° C. water 5% by mass or more, and still more preferably dissolves 10% by mass or more.

The copolymer resin of the present invention has an acid value of not less than 50 mgKOH/g and not more than 130 mgKOH/g.

The inventor of the present invention conducted detail investigations about various resins and found that there is close relationship between acid value of resin and abrasion resistance or adhesiveness such that the lower is the acid value of resin, the higher are abrasion resistance and adhesiveness. It is supposed that in case of acid value of resin being high, the resin becomes hydrophilic and affinity to the hydrophobic substrate becomes low, resulting in being difficult to adhere between the resin and the substrate. On the contrary, in case of acid value of resin being low, the resin becomes hydrophobic and affinity to the hydrophobic substrate becomes high, resulting in enhancing to adhere between the resin and the substrate.

Further, there is relationship between acid value of resin and ejection property of ink or maintenance property. In case of high acid value, since solubility of the resin in water is high and easy to solve in water, and dried ink on the head can be easily eliminated by dissolving and a force to be physically scraped away is lowered, thereby maintenance tends to become easily. Further, acid value of resin has effect to glossiness. In case of low acid value, it tends to result in increasing glossiness.

From above, an acid value of the copolymer resin is preferable not less than 50 mgKOH/g and not more than 130 mgKOH/g, more preferable not less than 50 mgKOH/g and not more than 100 mgKOH/g.

An acid value represents the number of milligrams of potassium hydroxide required to neutralize the acid which exists in the resin 1 g, and represents the quantity of the acid polar group which exists at so called terminal of molecule. Therefore, higher acid value means that there are many acidic groups such as a carboxyl group.

An acid value can be measured by the method defined by JIS K0070.

Further, the copolymer resin preferably has a glass transition temperature (Tg) of not less than 30° C. and not more than 100° C. In case of Tg being not less than 30° C., abrasion resistance is sufficient and blocking does not occur. In case of Tg being not more than 100° C., abrasion resistance becomes excellent. It is supposed that a film after drying keeps flexibility without being brittle at room temperature. Glass transition temperature (Tg) of the copolymer resin can be arranged by species and composition ratio of monomers used for copolymerization.

Weight-average molecular weight (Mw) of the above mentioned copolymer resin is not less than 20,000 and not more than 80,000. In case of weight-average molecular weight being not less than 20,000, abrasion resistance becomes better. In case of weight-average molecular weight being not more than 80,000, ink ejection or maintenance property becomes excellent. More preferable weight-average molecular weight of the copolymer resin is not less than 25,000 and not more than 70,000.

The weight average molecular weight of the above-mentioned copolymer resin can be arranged by reaction conditions, such as monomer concentration and an amount of an initiator in polymerization. For example, a weight average molecular weight may be arranged to be large by high monomer concentration or small by increasing an amount of an initiator.

As a copolymerizable monomer which constitutes the above-mentioned copolymer resin, it is required to include at least methyl methacrylate, alkyl acrylate or alkyl methacrylate and acid monomer, for enhancing abrasion resistance and adhesiveness.

The inventor of the present invention conducted detail investigations and found that it tends to be higher abrasion resistance or adhesiveness of the water soluble resin to the non-absorptive recording medium, when a carbon number of an alkyl group in alkyl acrylate or alkyl methacrylate is high and the acid monomer is acrylic acid or methacrylic acid, and a ratio of the copolymerization between of methyl methacrylate with alkyl acrylate or alkyl methacrylate is high. It is supposed that a water soluble resin having higher hydrophobic property enhances higher abrasion resistance or adhesiveness to the non-absorptive recording medium.

On the other hand, there is a tendency that smaller carbon numbers of the alkyl group of alkyl acrylate or alkyl methacrylate shows better ink repellency to the ink repellency treatment of the inkjet head. It is desirable in view of the small degradation of ink repellency that the carbon number of the alkyl group of alkyl acrylate or alkyl methacrylate is 8 or less.

Therefore, in order to balance abrasion resistance or adhesiveness with ink repellency, it is preferable to copolymerize methyl methacrylate with alkyl acrylate or alkyl methacrylate having carbon number of alkyl group being 2-8 by an amount of keeping good ink repellency.

Specific examples of alkyl acrylate or alkyl methacrylate having carbon number of the alkyl group being 2-8 include ethyl acrylate (methacrylate), n-butyl acrylate (methacrylate), i-butyl acrylate (methacrylate), t-butyl acrylate (methacrylate), n-hexyl acrylate (methacrylate), cyclohexyl acrylate (methacrylate), n-octyl acrylate(methacrylate), and 2-ethylhexyl acrylate(methacrylate).

Further, a copolymerization ratio of the alkyl acrylate or alkyl methacrylate having carbon number of alkyl group being 2-8 is preferable not less than 5% by mass based on a mass of total monomers comprising the copolymer resin according to the present invention in view of abrasion resistance or adhesiveness. In case of being less than 50% by mass, it is preferable in view of the ink repellency to the ink repellency treatment of the inkjet head. More preferable it is not less than 5% by mass and not more than 40% by mass.

It is preferable that methyl methacrylate is added 15-85% by mass based on whole monomers used as the raw material of the copolymer resin, and still more preferable 40-80% by mass.

Further, it is required that the total mass of methyl methacrylate, alkyl acrylate and alkyl methacrylate is not less than 80% by mass and not more than 95% by mass based on the whole monomer mass which constitutes copolymer resin in view of abrasion resistance or adhesiveness.

As acid monomers, acrylic acid, methacrylic acid, itaconic acid, maleic acid, and maleic acid half ester are listed. Especially, acrylic acid and methacrylic acid are preferable in view of stable ejection stability and good maintenance.

The above-mentioned copolymer resin may be added either before or after dispersing a pigment, but preferably added after dispersing a pigment. As for the mass ratio of the above-mentioned copolymer resin to a pigment, it is desirable not less than 1 and not more than 20.

Content of the copolymer resin is preferable not less than 1% by mass and not more than 20% by mass based on a total ink mass, more preferable not less than 3% by mass and not more than 15% by mass.

In the case when the copolymer resin has a mass ratio to pigment solid being more than 1 time, excellent abrasion resistance, adhesiveness and glossiness of the image can be obtained. In case of a mass ratio being not more than 20 times, ejection stability and maintenance property cannot be become impaired. More preferably, a mass ratio is not less than 1 time and not more than 10 times.

Resin other than the above-mentioned copolymer resin can be used in combination for inkjet ink of the present invention. The preferable content of the copolymer resin to whole resin contained in ink is not less than 50% by mass and not more than 100% by mass.

(Neutralization of Copolymer Resin)

In the copolymer resin, it is preferable that a portion corresponding to acidic monomer may preferably be neutralized partially or completely by using base. Bases for neutralizing acidic group include a base containing alkali metal (for example, NaOH and KOH), amines (for example, alkanol amines and alkyl amines) or ammonia.

In view of dissolving the copolymer resin into the ink or enhancing durability of image, it is preferable to neutralize by using amines having boiling point of not more than 200° C. In view of ejection stability, N,N-dimethyl aminoethanol and 2-amino-2 methyl propanol are specifically preferable.

As for addition amounts of a neutralization base, the effect by neutralization of the copolymer resin cannot be acquired in the case of being too small, and there occurs issues such as water resistance, discoloration, or odor, in the case of being too excess. Thereby it is preferable not less than 0.8 times and less than 3 times of chemical equivalent based on the above-mentioned acid value of the copolymer resin, and not less than 0.1% by mass and not more than 1% by mass based on the ink.

(Surfactant)

Next, a surfactant is explained.

In the present invention, surface tension of ink is controlled to be low by adding a surfactant. Thereby, onto a recording medium comprising various hydrophobic resins such as vinyl chloride sheet or paper substrate having slow ink absorption such as printing paper, a print image of high quality can be obtained without having no repelling or no hollow defect.

Herein, surface tension is a power which acts to make a surface area of a liquid as small as possible. By controlling this surface tension, it can be arranged a wettability of liquid to a solid. As the surface tension is lowered, it becomes easier to get wet a hydrophobic substrate. In addition, there are a static surface tension which is in the state where a liquid is hardly flowing, and a dynamic surface tension which is in the state where the interface is flowing. Both surface tensions are important to form an image by an inkjet printing.

The static surface tension of ink serves as an index of wettability by the ink to a substrate, when the ink is printed to form an image. When the static surface tension of the ink to the hydrophobic substrate is high, the ink will be repelled within several seconds after printing, and quality of image will deteriorate. On the other hand, the dynamic surface tension influences on a spread of the ink droplet at the moment of the ink deposition to the substrate. When the dynamic surface tension is high, ink droplet does not spread, the dot formed after the ink deposition will become small, and a solid image portion cannot be filled with the ink, resulting in causing a hollow defect.

With respect to the ink using a fixing resin of the present invention, the static surface tension of the ink rises depending on some kind of surfactant, when the ink is stored for a long period of time. When such ink is printed on a hydrophobic substrate after prolonged storage, it causes a repelling of ink drop, resulting in causing a deterioration of the image quality.

These inventors consider this phenomenon as follows: When fixing resin of the present invention, especially water-soluble fixing resin is used, the resin has low acid value and low water solubility, and also has a hydrophobic alkyl group. When a surfactant is added to the ink comprising water as a principal component in which this fixing resin is dissolved, the surfactant is usually considered to repeat adsorption and desorption to the hydrophobic fixing resin When the ink is stored for a long period of time, since the surfactant entwines gradually with the fixing resin being a polymer and becomes impossible to desorb, whereby the quantity of the surfactant which can work effectively will decrease, resulting in rising the surface tension.

The phenomenon in which static surface tension rises after prolonged storage of the ink occurs notably when the ink uses the fixing resin of the present invention. In the case of water soluble resin with usual large acid value and with high water solubility, since resin itself is hydrophilic and the surfactant does not adsorb even when it is stored for a long period of time, the rise of static surface tension hardly takes place.

The inventor of the present invention found that when the fluorochemical surfactant was used as a surfactant, the change of the static surface tension was disappeared even when the ink was stored for a long period of time.

This is considered as follows: When a surfactant is entwined by the hydrophobic fixing resin of the present invention, the surfactant having longer hydrophobic portion in the molecule is easier to be entwined by the polymer, thereby the static surface tension larger decreases after storage. On the contrary, the fluorochemical surfactant is a surfactant utilizing a strong hydrophobic property of fluorine. It can develop enough surface active effect, even if it has short hydrophobic portion including fluorine in the molecule. Thereby, the fluorochemical surfactant has shorter length of the hydrophobic portion in the molecule than other surfactants. Therefore, it is harder being entwined by the fixing resin than other surfactant, and the static surface tension tends not to fall after prolonged storage.

However, when the fluorochemical surfactant was singly used as a surfactant, in some cases, the dots formed from inkjet droplets became smaller than the case using other surfactants, and caused the hollow defect in the image. It is because the fluorochemical surfactant functions largely lowering the static surface tension, but does not function so much lowering the dynamic surface tension.

Therefore, a surfactant of polyoxyethylene alkyl ether which can reduce the dynamic surface tension was used in combination with the fluorochemical surfactant. The inventor found that even when the ink using the fixing resin of the preset invention was used after storage for a long period, there was no change of the static surface tension, ink repelling after printing can be inhibited, the hollow defect did not occur in the image due to a dot's contracting, and resulting in keeping the formation of a high quality print image over a long period of time.

The fluorochemical surfactant used by the present invention will be explained.

A fluorochemical surfactant referred to as a surfactant in which a part or all of hydrogen atoms combined with carbon of a hydrophobic group of the usual surfactant is replaced with fluorine. Of these, one having a perfluoro alkyl group or a perfluoro alkenyl group having a straight or branched chain in a molecule is preferable.

Following Formula (1) is listed as a preferable fluorochemical surfactant.

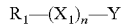  Formula (1)

In the Formula, $R_1$ represents perfluoro alkyl group or a perfluoro alkenyl group having a straight chain or a branched chain, $X_1$ presents a divalent linkage group, for example, such as an ethylene group, a phenylene group, or an oxygen atom, Y represents a water soluble group, an anionic group such as carboxylate salt or sulfonate, a cationic group such as quaternary ammonium salt, or a nonionic group such as polyethylene oxide group, and n represents an integer of 0 or 1.

In a fluorochemical surfactant, when carbon numbers of the main chain of the perfluoro alkyl group or a perfluoro alkenyl group are 3 or more and 6 or less, the surfactant becomes hard to be entwined by the fixing resin, thereby the rise of the static surface tension by prolonged storage can be inhibited more, and is still more preferable.

Examples of the fluorochemical surfactant are commercially available as "Megafac F" from DIC, "Surflon" from Asahi glass Co., Ltd., "Fluorad FC" from Minnesota Mining and Manufacturing, "Monflor" from Imperial Chemical Industries, "Zonyls" from E.I. DuPont, "Licowet VPF" from Farbwerke Heochest AG, as well as "FTERGENT" from NEOS Co., Ltd. under the trade names.

Next, the surfactants of the polyoxyethylene alkyl ethers used by the present invention will be explained.

In the present invention, any surfactants of polyoxyethylene alkyl ethers may be used, but preferable is Formula (2).

  Formula (2)

R2 represents an alkyl group having straight or branch chain, X2 represents a divalent linkage group, for example, such as an ethylene group, a phenylene group, an oxygen atom, m represents an integer of 0 or 1, and k represents an integer of 10 to 30.

As polyoxyethylene alkyl ethers, it is preferable that $R_2$ in Formula (2) is a straight or a branched alkyl group having carbon numbers of 4 or more and 9 or less, because that the surfactant is hard being entwined by the fixing resin, and a branched alkyl group is still more preferable.

Many surfactants of the polyoxyethylene alkyl ether are marketed from each company. For example, it is marketed by the brand name BYK-DYNWET800 from BYK-Chemie GmbH.

Surfactants other than the above-mentioned surfactant can be also employable to the inkjet ink of the present invention. For example, listed are anionic surfactant such as dialkyl sulfo succinic acid salts, alkyl naphthalene sulfonates, and fatty acid salts; nonionic surfactants such as acetylene glycols; cationic surfactants such as alkylamine salts and quaternary ammonium salts.

(Pigment)

Pigment utilizable in this invention includes an organic and an inorganic pigment conventionally well known in the art. For example, listed are an azo pigment such as an azo lake, insoluble azo pigment, condensed azo pigment and chelate azo pigment; a polycyclic pigment such as a phthalocyanin pigment, perylene and perylene pigment, anthraquinone pigment, quinacridone pigment, dioxadine pigment, thioindigo pigment, isoindolinone pigment and quinophthalone pigment; a dye lake such as a basic dye type lake, and acidic dye type lake; an organic pigment such as a nitro pigment, nitroso pigment, aniline black and daylight fluorescent pigment; and an inorganic pigment such as a carbon black.

As specific pigments which are preferably usable, the following pigments are listed:

As magenta or red pigments, listed are, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

As orange or yellow pigments, listed are, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, and C.I. Pigment Yellow 138.

As green or cyan pigments, listed are, for example, C.I. Pigment Blue 15, C.I. Pigment Blue 15:2, C.I. Pigment Blue 15:3, C.I. Pigment Blue 16, C.I. Pigment Blue 60, and C.I. Pigment Green 7.

(Pigment Dispersion)

So as to maintain stable dispersion of above pigment in a water-based ink, various treatments are carried out to prepare pigment dispersion.

The dispersion may be any one provided being stably dispersible in a water phase and can be selected from such as a pigment dispersion in which a pigment is dispersed by polymer resin, capsule pigment in which a pigment is covered with a water insoluble resin, self-dispersible pigment in which the surface of a pigment is modified to be dispersible without a dispersion resin.

Further, a pigment may be dispersed with the copolymer resin according to the present invention described above as dispersing resin of pigment.

As for a dispersion method of a pigment, various types such as a ball mill, a sand mill, an attritor, a roll mill, an agitator, a Henschel mixer, a colloidal mill, a ultrasonic homogenizer, a pearl mill, a wet-type jet mill and a paint shaker can be utilized.

In this invention, it is also preferable to utilize a centrifugal separator or to utilize a filter for elimination of coarse particles in pigment dispersion.

Further, in the case of utilizing capsule pigment in which a pigment is covered with a water-insoluble resin, a water-insoluble resin refers to a resin which is insoluble in water in a range of weak acidic to weak basic, and preferably the solubility of which against aqueous solution of pH 4-10 is less than 2%.

Such a resin includes each resin of such as an acryl type, a styrene-acryl type, an acrylonitrile-acryl type, a vinyl acetate type, a vinyl acetate-acryl type, a vinyl acetate-vinyl chloride type, a polyurethane type, a silicone-acryl type, an acryl silicone type, a polyester type and an epoxy type.

The dispersing resin or the water-non-soluble resin preferably has a weight-average molecular weight of from 3,000 to 500,000, more preferably from 7,000 to 200,000.

The dispersing resin or the water-non-soluble resin preferably has a glass transition temperature (Tg) from about −30° C. to 100° C., more preferably from about −10° C. to 80° C.

Mass ratio of pigment to resin for dispersing pigment is preferably selected in the range of not less than 100/150 and not more than 100/30, represented by Pigment/Resin ratio. When Mass ratio of pigment to resin for dispersing pigment is less than 100/150, the dispersing resin which does not absorbed to the pigment or the non-water-soluble resin which does not cover the pigment exists more in the ink, thereby it may cause to deteriorate the ink ejecting stability or ink storage stability. Specifically, good durability of the image, ejecting stability and ink storage stability are exhibited in the range of not less than 100/100 and not more than 100/40.

The average particle diameter of the pigment particles which are coated by non-water-soluble resin is preferably about 80 to 150 nm, in terms of ink storage stability and color forming properties.

Various conventional methods are applicable as a method for coating pigment by non-water-soluble resin. Preferable is a method in which non-water-soluble resin is dissolved in organic solvent such as methyl ethyl ketone, followed by partially or completely neutralizing acid group in the resin by base. Then pigment and ion-exchanged water are added and dispersed. After eliminating organic solvent, water is added to arrange as appropriate. Or preferable is a method in which pigment is dispersed by using polymerizable surfactant, and coated while polymerization is carried out by supplying monomer thereto.

Further, self-dispersing pigment which is surface treated available on the market may be applicable. Specific examples of preferable self-dispersing pigments include CAB-JET 200, CABO-JET 300 (produced by Cabot Corporation), and BONJET CW1 (produced by Orient Chemical Industries Co., Ltd).

(Organic Solvent)

Water soluble organic solvent is included in the ink of the present invention. Organic solvent having low surface tension may be preferably added to the ink of the present invention.

Addition of organic solvent having low surface tension enables to inhibit ink mixing more even to a recording medium made of various hydrophobic resins such as soft vinyl chloride sheet, or a paper support having low ink absorption such as printing paper, resulting in having high quality print images. It is considered that the organic solvent having low surface tension functions to improve ink wettability to vinyl chloride, as well as the copolymer resin functions to increase ink viscosity according to drying water in ink.

Especially glycol ethers or 1,2-alkanediols is preferably added to the ink used for the present invention. Specifically preferred is to employ following water-soluble organic solvent.

Specific examples of glycolethers include ethylene glycol monoethyl ether, ethylene glycol monobutyl ether, diethylene glycol monoethyl ether, diethylene glycol monobutyl ether, triethylene glycol monobutyl ether; propyleneglycol monopropyl ether, dipropylene glycol monomethyl ether; and tripropylene glycol monomethyl ether.

Specific examples of 1,2-alkanediols include 1,2-butanediol, 1,2-pentanediol, 1,2-hexanediol, and 1,2-heptanediol.

Further, preferred is addition of solvent capable of dissolving, softening or swelling a recording medium such as vinyl chloride, because it enables to enhance adhesiveness between vinyl chloride and the copolymer resin, whereby enhances adhesiveness and abrasion resistance of image.

These solvents include cyclic solvents containing a nitrogen atom or sulfur atom, cyclic ester solvents, lactic acid esters, alkyleneglycol diether, alkyleneglycol monoether monoester and dimethyl sulfoxide.

Specific examples of preferable cyclic solvent containing a nitrogen atom is a cyclic amide compound and a 5-8-member ring, and includes such as 2-pyrrolidone, N-methyl-2-pyrrolidone, N-ethyl-2-pyrrolidone, 1,3-dimethyl-2-imizolidinone, $\epsilon$-caprolactam, methyl caprolactam and 2-azacyclooctanone.

The cyclic solvent containing a sulfur atom is preferably a 5-7-member ring and includes such as sulforane.

Specific example of the cyclic ester solvent includes such as $\gamma$-butyllactone and $\epsilon$-caprolactone; specific example of the lactic acid ester includes butyl lactate and ethyl lactate.

Specific example of the alkyleneglycol diether includes diethyleneglycol diethylether.

Specific example of the alkyleneglycol monoether monoester includes diethyleneglycol monoethyl monoacetate.

Other than above, listed are alcohols (such as methanol, ethanol, propanol, isopropanol, butanol, isobutanol, secondary butanol, and tertiary butanol), polyhydric alcohols (such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol and thioglycol), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine), and amides (such as formamide, N,N-dimethylformamide and N,N-dimethylacetoamide).

(Heating of Recording Medium)

By employing the water-based inkjet ink of the present invention, it enables to print a high-quality image without ink mixing on the non-absorptive recording medium, whereby to form excellent image having high glossiness, high abrasion resistance and adhesiveness.

In terms of forming higher quality image having abrasion resistance and adhesiveness and corresponding to faster printing conditions, printing is preferably performed while heating a recording medium at not less than 35° C. and not more than 60° C. At more than 35° C., heating produces enough effects and at not more than 60° C., a recording medium made of vinyl chloride can keep its flatness, and ejection becomes stable due to slightly drying ink at head.

Further, it is more preferable that print is heat-dried at not less than 50° C. and not more than 90° C. after printing while heating, because heating after printing enables to accelerate drying as well as enhancing adhesiveness between the copolymer resin and the non-absorptive recording medium. This effect is specifically obtained when printing onto the non-absorptive recording medium. When an organic solvent has relatively higher boiling point than water in an ink, sometimes the organic solvent cannot be dried and remains on a surface of printing side. The residual solvent exists in combination with copolymer resin on the printing surface and sometimes causes insufficient film-forming and curing of the copolymer resin, whereby resulting in decreasing abrasion resistance or adhesiveness. When further heat-drying is carried out after printing, the residual solvent on the non-absorptive recording medium can be eliminated, whereby abrasion resistance and adhesiveness can be enhanced more.

When using an absorptive recording medium such as paper, a residual solvent can be absorbed into the recording medium and does not remain at the surface of printing side, whereby above phenomena does not occur.

As for the heating temperature, heating is preferably performed at not less than 50° C. in terms of accelerating a elimination of residual solvent and at not more than 90° C. in terms of inhibiting deformation of a recording medium by heating.

As for a specific heat-drying method, listed are a method in which heating is performed by heater after printing from a back side of a recording medium, a method in which heating is performed by a warm air blow from a printing side of a recording medium, or a method in which heating of a recording medium is performed by radiation heat of infrared ray by use of such as a halogen lamp.

EXAMPLES

Embodiments of the present invention will now be specifically described with the reference to examples, however the present invention is not limited thereto. Incidentally, the expression of "part" or "%" referred to in Examples represents "part by mass" or "% by mass" unless otherwise specified.

Example 1

(Synthesis of Copolymer Resin)
(Synthesis of Copolymer Resin P-1)

Into a flask provided with a dropping funnel, a condenser, a nitrogen gas directing tube, a thermometer, and a mechanical stirrer, were loaded 186 parts of 2-propanol and heated to reflux, while bubbling a nitrogen gas. Into the dropping funnel, 76 parts of methyl methacrylate, 13 parts of 2-ethylhexyl acrylate, 11 parts of methacrylic acid and 0.5 parts of initiator (AIBN) were dissolved in mixture, and the mixture was dropped for about 2 hours. Thereafter, resulting solution was heated to reflux for further 5 hours. After standing to cool the reaction solution, 2-propanol was distilled away under reduced pressure to obtain Copolymer resin P-1.

(Synthesis of Copolymer Resins P-2 to P-21)

Copolymer resins P-2 to P-21 were synthesized in the same manner as Synthesis of Copolymer resin P-1, according to the monomer composition ratio listed in Table 1. Herein, weight average molecular weights (Mw) were arranged by changing amount of initiator.

The measurement of Tg and weight average molecular weights (Mw) of the above-mentioned copolymer resin are conducted as follows.

(Measurement of Tg)

Tg was determined by using DSC under nitrogen gas flow (DSC-7 differential scanning calorimeter (produced by Perkin Elmer Corp.) and TAC7/DX thermal analysis equipment controller (produced by Perkin Elmer Corp.)). DSC was measured in the range of −30 to 100° C. or 0 to 130° C. at a temperature-raising rate of 10° C./min. After cooling, temperature was raised again and the measurement was carried out. Tg was calculated from the measured value at raising temperature again.

(Measurement of Weight Average Molecular Weight)

The weight average molecular weight (Mw) was determined via GPC. Measurement conditions are as follows Columns: TSK gel G40000+2500+2000HXL (produced by Tosoh Corporation), 40° C.
Solvent: THF 1.0 (ml/min)
Injection amount: 100 μl
Detector: R1
Calibration curve: Standard polystyrene (Preparation of the Aqueous Solution of Copolymer Resin)

Into 20 parts of the above-mentioned copolymer resin P-1, 67.8 parts of ion exchanged water, 12.2 parts of N,N-dimethylamino ethanol as a base for neutralization were added and heating-stirring at 70° C. to dissolve the resin. An aqueous solution of copolymer resin P-1 having resin solid content of 20% was obtained. Herein, the quantity of N,N-dimethylamino ethanol corresponds to 1.05 times of the quantity of chemical equivalent number based on the chemical equivalent number of the acid group of copolymer resin P-1.

Subsequently, aqueous solution of copolymer resins P-2 to P-21 were prepared in the same manner as aqueous solution of the above-mentioned copolymer resin P-1, except for using base for neutralization listed in Table 2 instead of N,N-dimethylamino ethanol.

Herein, since the resin did not dissolve either in 2% by mass of N,N-dimethylamino ethanol aqueous solution or 25° C. water and the solution had become cloudy, copolymer resin P-21 was not able to be used for later preparation of the ink.

TABLE 1

| Copolymer resin | Monomer composition ratio (% by mass) | | | | | | | | | | | | | | Physical properties | | |
|---|---|---|---|---|---|---|---|---|---|---|---|---|---|---|---|---|---|
| | Acrylic ester | | | | | | Methacrylic ester | | | | | Acidic monomer | | Others | | | |
| | MMA | EA | BA | HA | EHA | LA | EMA | BMA | HMA | EHMA | SMA | MAA | AA | St | Tg (° C.) | Acid value | Mw |
| P-1 | 76 | — | — | — | 13 | — | — | — | — | — | — | 11 | — | — | 85 | 73 | 29,000 |
| P-2 | 67 | — | — | 20 | — | — | — | — | — | — | — | — | 13 | — | 54 | 100 | 58,000 |
| P-3 | 57 | — | 34 | — | — | — | — | — | — | — | — | 9 | — | — | 35 | 58 | 32,000 |
| P-4 | 56 | 13 | 12 | — | — | — | — | — | — | — | — | 19 | — | — | 69 | 124 | 76,000 |
| P-5 | 77 | — | 6 | — | 7 | — | — | — | — | — | — | 10 | — | — | 83 | 64 | 33,000 |
| P-6 | 64 | — | 17 | — | 10 | — | — | — | — | — | — | 9 | — | — | 50 | 60 | 39,000 |
| P-7 | 68 | — | — | — | — | 20 | — | — | — | — | — | 12 | — | — | 89 | 77 | 33,000 |
| P-8 | 62 | — | — | — | — | — | — | — | — | 20 | — | 18 | — | — | 95 | 117 | 22,000 |
| P-9 | 46 | — | — | — | — | — | — | — | 37 | — | — | 17 | — | — | 68 | 111 | 33,000 |
| P-10 | 50 | — | — | — | — | — | — | 35 | — | — | — | — | 15 | — | 72 | 118 | 46,000 |
| P-11 | 50 | — | — | — | — | — | 15 | — | — | 20 | — | 15 | — | — | 87 | 98 | 41,000 |
| P-12 | 48 | — | 23 | — | — | — | — | 16 | — | — | — | 13 | — | — | 48 | 86 | 52,000 |
| P-13 | 61 | — | — | — | 7 | — | — | 20 | — | — | — | 12 | — | — | 77 | 79 | 38,000 |
| P-14 | 66 | — | — | — | — | — | — | — | — | — | 18 | 16 | — | — | 85 | 103 | 28,000 |

TABLE 1-continued

| Copolymer | Monomer composition ratio (% by mass) | | | | | | | | | | | | | | | Physical properties | | |
|---|---|---|---|---|---|---|---|---|---|---|---|---|---|---|---|---|---|---|
| | | Acrylic ester | | | | | Methacrylic ester | | | | | Acidic monomer | | Others | | | | |
| resin | MMA | EA | BA | HA | EHA | LA | EMA | BMA | HMA | EHMA | SMA | MAA | AA | St | Tg (° C.) | Acid value | Mw |
| P-15 | 40 | 17 | — | — | — | — | — | — | — | — | — | 13 | — | 30 | 85 | 86 | 29,000 |
| P-16 | 44 | — | 30 | — | 15 | — | — | — | — | — | — | 11 | — | — | 18 | 73 | 41,000 |
| P-17 | 70 | — | — | — | — | — | 10 | — | — | — | — | 20 | — | — | 115 | 131 | 36,000 |
| P-18 | 63 | — | 21 | — | — | — | — | — | — | — | — | 16 | — | — | 68 | 105 | 14,000 |
| P-19 | 58 | 10 | — | — | — | — | — | — | — | 15 | — | 17 | — | — | 83 | 112 | 89,000 |
| P-20 | 50 | — | — | — | 25 | — | — | — | — | — | — | 25 | — | — | 69 | 164 | 37,000 |
| P-21 | 65 | — | — | — | — | — | — | 29 | — | — | — | 6 | — | — | 81 | 40 | 28,000 |

Tg (° C.), acid value (mgKOH/g) and weight average molecular weight (Mw) of the above-mentioned copolymer resins were listed in Table 1. Monomers described by abbreviation in Table 1 were as follows:

MMA: Methyl methacrylate
EA: Ethyl acrylate
BA: n-Butyl acrylate
HA: n-Hexyl acrylate
EHA: 2-Ethylhexyl acrylate
LA: Lauryl acrylate
EMA: Ethyl methacrylate
BMA: n-Butyl methacrylate
HMA: n-Hexyl methacrylate
EHMA: 2-Ethylhexyl methacrylate
SMA: Stearyl methacrylate
MAA: Methacrylic acid
AA: Acrylic acid
St: Styrene (Preparation of Cyan Pigment Dispersion)

Into ion exchanged water of 60 parts, 15 parts of DISPER-BYK-190 (produced by BYK-Chemie GmbH) and 10 parts of 2-pyrrolidinone were added and mixed. Into solution, 15 parts of C.I. Pigment Blue 15:3 was added. After pre-mixing, the resulting solution was dispersed by use of a sand grinder filled at a volume ratio of 50% with zirconia beads of 0.5 mm, whereby Cyan pigment dispersion having pigment content of 15% was prepared.

(Preparation of Ink C-1)

Into 30 parts of Copolymer resin P-1 aqueous solution, 23.5 parts of ion exchanged water, 5 parts of dipropyleneglycol propylether, 10 parts of dipropyleneglycol methylether, 10 parts of 2-pyrrolidinone, 0.5 parts of fluorochemical surfactant (F-1) and 1 part of compound of polyoxyethylene alkylethers (O-1) were added and stirred. Then, loaded was 20 parts of the cyan pigment dispersion thereto and mixed, followed by filtering by 1 μm filter, whereby Cyan ink C-1 was prepared.

(Preparation of Inks C-2 to C-25)

Inks C-2 to C-25 were prepared in the same manner as Ink C-1 by changing the content of copolymer resin P-1 aqueous solution and copolymer resin, organic solvent, surfactant and the mass ratio of Copolymer/Pigment as listed in Table 2. In Table 2, contents of resin in copolymer resin and organic solvent represents content based on ink (% by mass).

Bases for neutralization, organic solvents, and surfactants described by abbreviation in Table 2 were as follows:

(Base for Neutralization)
DMAE: N,N-Dimethyl aminoethanol
AMP: 2-Amino-2-methylpropanol (Organic Solvent)
DPGPE: Dipropyleneglycol propylether
DEGBE: Diethyleneglycol monobutylether
HDO: 1,2-Hexane diol
DPGME: Dipropyleneglycol methylether
2-PDN: 2-pyrrolidinone (Surfactant)
F-1: $CF_3(CF_2)_5CH_2CH_2COONH_4$

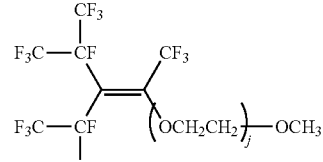

F-2 j: Integer of 10-25

F-3: $CF_3(CF_2)_9COONH_4$
O-1: $C_8H_{17}(OCH_2CH_2)_hOH$
Herein, $C_8H_{17}$ is 2-ethyl hexyl group, and h is an integer of 15-30.
O-2: $C_{12}H_{25}(OCH_2CH_2)_gOH$
Herein, $C_{12}H_{25}$ is n-dodecyl group, and g is an integer of 20-40.
S-1: Silicone based surfactant BYK-348 (BYK-Chemie Gmb)
Herein, F-1 to F-3 and O-1 and 2 are the fluorochemical surfactants and the compounds of polyoxyethylene alkyl ethers of the present invention, respectively.

TABLE 2

| Ink | Fixing resin | | Base for neutralization | Pigment concentration | Mass ratio Pigment/ Fixing resin | Content of Organic solvent | | | | | Surfactant |
|---|---|---|---|---|---|---|---|---|---|---|---|
| | Species | Content | | | | DPGPE | DEGBE | HDO | DPGME | 2-PDN | |
| C-1 | P-1 | 6.0% | DMAE | 3.0% | 2.0 | 5% | — | — | 10% | 10% | F-1 O-1 |
| C-2 | P-2 | 5.0% | DMAE | 3.0% | 1.7 | — | — | 5% | 10% | 10% | F-1 O-1 |
| C-3 | P-3 | 6.0% | AMP | 3.0% | 2.0 | — | 10% | — | 10% | 10% | F-2 O-1 |
| C-4 | P-4 | 4.0% | Ammonia | 3.0% | 1.3 | 5% | — | — | 10% | 10% | F-1 O-1 |

TABLE 2-continued

| Ink | Fixing resin Species | Fixing resin Content | Base for neutralization | Pigment concentration | Mass ratio Pigment/ Fixing resin | DPGPE | DEGBE | HDO | DPGME | 2-PDN | Surfactant | |
|---|---|---|---|---|---|---|---|---|---|---|---|---|
| C-5  | P-5  | 6.0% | DMAE    | 3.0% | 2.0  | 5%  | —   | —  | 10% | 10% | F-1 | O-1 |
| C-6  | P-6  | 7.0% | DMAE    | 3.0% | 2.3  | —   | —   | 5% | 10% | 10% | F-1 | O-2 |
| C-7  | P-7  | 6.0% | DMAE    | 3.0% | 2.0  | —   | —   | 5% | 10% | 10% | F-2 | O-1 |
| C-8  | P-8  | 7.0% | Ammonia | 0.7% | 10.0 | 5%  | —   | —  | 10% | 10% | F-2 | O-1 |
| C-9  | P-9  | 6.0% | DMAE    | 3.0% | 2.0  | 5%  | —   | —  | 10% | 10% | F-1 | O-1 |
| C-10 | P-10 | 8.0% | DMAE    | 3.0% | 2.7  | —   | 10% | —  | 10% | 10% | F-1 | O-1 |
| C-11 | P-11 | 6.0% | AMP     | 3.0% | 2.0  | 5%  | —   | —  | 10% | 10% | F-3 | O-1 |
| C-12 | P-12 | 7.0% | Ammonia | 3.0% | 2.3  | —   | —   | 5% | 10% | 10% | F-2 | O-1 |
| C-13 | P-13 | 6.0% | DMAE    | 3.0% | 2.0  | —   | —   | 5% | 10% | 10% | F-1 | O-1 |
| C-14 | P-14 | 5.0% | DMAE    | 3.0% | 1.7  | 5%  | —   | —  | 10% | 10% | F-2 | O-1 |
| C-15 | P-1  | 2.5% | DMAE    | 3.0% | 0.8  | 5%  | —   | —  | 10% | 10% | F-1 | O-1 |
| C-16 | P-1  | 6.0% | DMAE    | 3.0% | 2.0  | —   | —   | 5% | 10% | 10% | F-1 | —   |
| C-17 | P-1  | 6.0% | DMAE    | 3.0% | 2.0  | 5%  | —   | —  | 10% | 10% | O-1 | —   |
| C-18 | P-1  | 6.0% | DMAE    | 3.0% | 2.0  | 5%  | —   | —  | 10% | 10% | S-1 | —   |
| C-19 | P-15 | 6.0% | DMAE    | 3.0% | 2.0  | —   | 10% | —  | 10% | 10% | F-1 | O-1 |
| C-20 | P-16 | 6.0% | Ammonia | 3.0% | 2.0  | 5%  | —   | —  | 10% | 10% | F-1 | O-1 |
| C-21 | P-17 | 7.0% | DMAE    | 3.0% | 2.3  | 5%  | —   | —  | 10% | 10% | F-2 | O-1 |
| C-22 | P-18 | 6.0% | DMAE    | 3.0% | 2.0  | —   | —   | 5% | 10% | 10% | F-2 | O-1 |
| C-23 | P-19 | 5.0% | DMAE    | 3.0% | 1.7  | 5%  | —   | —  | 10% | 10% | F-1 | O-1 |
| C-24 | P-20 | 6.0% | AMP     | 3.0% | 2.0  | 5%  | —   | —  | 10% | 10% | F-1 | O-1 |
| C-25 | P-21 | 6.0% | DMAE    |      |      | Resin is unsolved. | | | | | | |

Each ink prepared above was evaluated according to the following methods. Herein, surface tension of each ink determined by plate method was in the range of 22-28 mN/m.

(Image Formation)

Each Cyan ink prepared above was set in one of the inkjet head in an on-demand type inkjet printer which has 4 lines of piezo type heads where a nozzle pore size was 28 µm, a driving frequency was 18 kHz, a nozzle number was 512, an amount of an minimum ink droplet was 12 pl, and a nozzle density was 180 dpi.

The printer can warm a medium from the bottom (the opposite side facing to the head) by a contact type heater at appropriate temperature, being equipped with a position for ink idle print and a maintenance unit in a head housing position, and can perform head cleaning in arbitrary frequency.

Then, onto recording medium of soft vinyl chloride sheet for solvent inkjet printer, images with a printing resolution 720 dpi×720 dpi, and solid image by 10 cm×10 cm size with 100% and 30% Duty were printed to be a recorded image.

During printing onto the polyvinyl chloride recording medium, back side of the recording medium was heated by controlling heater to be at 50° C. at a surface temperature of the recording medium when image was recorded. Herein, the surface temperature of the recording medium was determined by using Non-contact thermometer (IT-530N type produced by Horiba Ltd.). After recording, the printed matter was dried for 24 hours under room temperature (25° C.) and recorded images and printing performances were evaluated as follows.

(Evaluation of Ink and Recorded Image)

(Abrasion Resistance)

Each of the resulting images with 100% Duty was scrubbed by dry cotton (Kanakin No. 3) with load of 300 g. Abrasion resistance was evaluated based on the following criteria.

A: No change was observed in image under friction of 50 times or more.

B: Slight scratch remained but did not affect image density after friction of 50 times.

C: Image density became lowered during friction between 21 and less than 50 times, but it is considered to be practically preferable.

D: Image density became lowered under friction of less than 20 times and it is considered to be practically problematic.

(Evaluation of Adhesiveness)

Three cm of adhesive cellophane tape was adhered onto each resulting image of 100% Duty. After that, the tape was quickly peeled from the layer, and the surface state of the image was observed.

A: No change was observed at the surface state.

B: Slight trace was remained on the surface, but it is considered to be practically preferable.

C: A part of the image was peeled off and the decrease of color density was observed, but it is considered to be practically preferable.

D: Most of the image was peeled off and the substrate was observed as white background and it is considered to be practically problematic.

(Evaluation of Ejection Stability)

Under the ambience of 25° C., relative humidity 25%, evaluation images of 100% Duty were printed continuously 10 times, and image in 10th print was evaluated based on the following criteria.

A: No image defect was noted.

B: Slight blur was observed at the start portion of the image (not more than 2 mm).

C: Slight image defect (lines caused by ink ejection failure) was observed.

D: Much image defects caused by ink ejection failure were observed.

(Evaluation of Repelling)

The image of 100% Duty was observed visually.

A: No failure by repelling was observed in a printed portion.

B: Slight unevenness of image was observed by magnifying with loupe, but it does not influence to the image quality.

C: Unevenness of image was observed in a part of image by gazing the image, but it is a range which is not conspicuous.

D: Repelling spots were observed in the image. It is conspicuous and practically problematic.

(Dot Diameter)

The image of 30% Duty was magnified by 500 times with the optical microscope, and the diameter of the isolated dot was measured.

A: 55 μm or more
B: More than 51 μm and less than 55 μm
C: More than 47 μm and less than 51 μm
D: Less than 47 μm Herein, in the case of dot diameter of less than 47 μm, an image was not completely covered even by Duty 100% and hollow defect was observed.

(Storage Stability of Surface Tension)

After storing an ink for one month at 25° C., the static surface tension was measured and compared with the value before storage.

A: The difference of the static surface tension before and after storage is less than 1 mN/m.
B: The static surface tension after storage increased from 1 to less than 1.5 mN/m.
C: The static surface tension after storage increased from 1.5 to less than 2 mN/m.
D: The static surface tension after storage rose by 2 or more mN/m.

Results were listed in Table 3.

Herein, the ink having one or more D rank in the evaluation results is practically problematic.

for 5 minutes at the temperature described in Table 4 immediately after printing and further drying for 12 hours at room temperature.

After printing, back side of the recorded image was heat-dried by controlling heater to be the temperature described in Table 4 at a surface temperature of the recording medium. Herein, the surface temperature of the recording medium was determined by using Non-contact thermometer.

Resulting recorded image were evaluated as follows:

(Abrasion Resistance 2)

Each of the resulting images of 100% Duty was scrubbed by dry cotton (Kanakin No. 3) with load of 600 g. Abrasion resistance was evaluated based on the following criteria.

A: No change was observed in image during frictions of 50 times or more.
B: Slight scratch remained but did not affect image density after frictions of 50 times.
C: Image density became lowered during frictions between 21 and less than 50 times.
D: Image density became lowered during frictions of less than 20 times.

TABLE 3

| | | | Evaluation results | | | | |
|---|---|---|---|---|---|---|---|
| Ink | Durability | Adhesiveness | Ejection | Repelling | Dot diameter | Storage stability Surface tension | Remarks |
| C-1 | A | A | A | A | A | A | Inv. |
| C-2 | A | A | A | A | A | A | Inv. |
| C-3 | B | A | A | A | A | A | Inv. |
| C-4 | B | A | A | B | B | A | Inv. |
| C-5 | A | A | A | A | A | A | Inv. |
| C-6 | A | A | A | A | A | B | Inv. |
| C-7 | A | A | A | A | A | C | Inv. |
| C-8 | B | B | A | A | A | A | Inv. |
| C-9 | A | A | A | A | A | A | Inv. |
| C-10 | A | A | A | A | A | A | Inv. |
| C-11 | A | A | A | A | A | C | Inv. |
| C-12 | A | B | A | A | A | A | Inv. |
| C-13 | A | A | A | A | A | A | Inv. |
| C-14 | A | A | A | A | A | C | Inv. |
| C-15 | A | A | A | A | A | A | Inv. |
| C-16 | A | A | A | B | D | B | Comp. |
| C-17 | A | A | A | D | C | B | Comp. |
| C-18 | A | A | A | B | C | D | Comp. |
| C-19 | D | D | A | B | A | B | Comp. |
| C-20 | D | C | A | A | A | C | Comp. |
| C-21 | D | D | B | A | A | A | Comp. |
| C-22 | D | C | B | B | A | A | Comp. |
| C-23 | C | C | D | B | B | C | Comp. |
| C-24 | D | D | A | C | B | B | Comp. |
| C-25 | | | Resin was not dissolved. | | | | Comp. |

Inv.: Inventive Example,
Comp.: Comparative Example

The results described in Table 3 clearly show that each of the inks of the present invention exhibits excellent performances such as abrasion resistance and adhesiveness in case of printing onto polyvinylchloride as recording medium, as well as ink ejection, repelling and dot diameter at image forming, and further small change of the surface tension during ink storage, compared to the comparative inks.

Example 2

By using inks C-1 and C-21 used in Example 1, printing was performed under the same conditions as Example 1. Then, instead of drying after printing for 24 hours at room temperature (25° C.), printed images were prepared by drying Ranks A to C were considered to be practically preferable in above criteria.

(Adhesiveness 2)

Three cm of adhesive cellophane tape was adhered onto each resulting image of 100% Duty. After that, the tape was quickly peeled from the layer repeatedly 5 times at the same position, and the surface state of the image was observed.

A: No change was observed at the surface state.
B: Slight trace was remained on the surface.
C: A part of the image was peeled off and the decrease of color density was observed.
D: Most of the image was peeled off and the substrate was observed as white background.

Ranks A to C were considered to be practically preferable in above criteria.

Results were listed in Table 4.

TABLE 4

| Ink | Drying temperature | Abrasion resistance 2 | Adhesiveness 2 | Remarks |
|---|---|---|---|---|
| C-1 | 25° C. | C | B | Inv. |
|  | 60° C. | B | A | Inv. |
|  | 80° C. | A | A | Inv. |
| C-2 | 25° C. | D | D | Comp. |
|  | 60° C. | D | D | Comp. |
|  | 80° C. | D | D | Comp. |

Inv.: Inventive Example,
Comp.: Comparative Example

The results described in Table 4 clearly show that each of the inks of the present invention exhibits excellent abrasion resistance and adhesiveness in case of printing onto polyvinylchloride as recording medium, compared to the comparative inks. Further, performance was more improved in case of heat-drying than drying only at room temperature.

Example 3

(Preparation of Pigment Dispersion and Ink)

Yellow, Magenta, Cyan, Black Pigment dispersion each was prepared in the same manner as Cyan Pigment dispersion in Example 1, by using C.I. Pigment Yellow 74, C.I. Pigment Red 122, and carbon black, as well as C.I. Pigment Blue 15:3.

Ink sets listed in Table 5 were prepared in the same manner as Example 1, except for arranging content of copolymer resin to the ink and mass ratio of Copolymer to Pigment so as to be listed in Table 5, by employing species and content of copolymer resin, base for neutralization, organic solvent and surfactant used in Example 1.

TABLE 5

| Ink set | Ink | Pigment dispersion | Fixing resin Species | Content | Base for neutralization | Mass ratio Pigment/Fixing resin | Content of Organic solvent DPGPE | DPGME | 2-PDN | | Surfactant |
|---|---|---|---|---|---|---|---|---|---|---|---|
| Ink set 1 | Y-101 | Yellow | P-1 | 6% | DMEAE | 2.0 | 5% | 10% | 10% | F-2 | O-1 |
|  | M-101 | Magenta | P-1 | 7% | DMEAE | 2.3 | 5% | 10% | 10% | F-2 | O-1 |
|  | C-101 | Cyan | P-1 | 6% | DMEAE | 2.0 | 5% | 10% | 10% | F-2 | O-1 |
|  | K-101 | Black | P-1 | 6% | DMEAE | 2.0 | 5% | 10% | 10% | F-2 | O-1 |
| Ink set 2 | Y-102 | Yellow | P-17 | 6% | DMEAE | 2.0 | 5% | 10% | 10% | F-2 | O-1 |
|  | M-102 | Magenta | P-17 | 7% | DMEAE | 2.3 | 5% | 10% | 10% | F-2 | O-1 |
|  | C-102 | Cyan | P-17 | 6% | DMEAE | 2.0 | 5% | 10% | 10% | F-2 | O-1 |
|  | K-102 | Black | P-17 | 6% | DMEAE | 2.0 | 5% | 10% | 10% | F-2 | O-1 |
| Ink set 3 | Y-103 | Yellow | P-1 | 6% | DMEAE | 2.0 | 5% | 10% | 10% | S-1 | — |
|  | M-103 | Magenta | P-1 | 7% | DMEAE | 2.3 | 5% | 10% | 10% | S-1 | — |
|  | C-103 | Cyan | P-1 | 6% | DMEAE | 2.0 | 5% | 10% | 10% | S-1 | — |
|  | K-103 | Black | P-1 | 6% | DMEAE | 2.0 | 5% | 10% | 10% | S-1 | — |

(Image Formation)

These ink set were set in the on-demand type inkjet printer used in Example 1. Then, images by 10 cm×10 cm size with 100% Duty and 30% Duty were printed to be a recorded image.

(Evaluation of Ink and Recorded Image)

About the obtained evaluation images, abrasion resistance, adhesiveness, ejection stability, repelling, dot diameter, and storage stability of surface tension were evaluated in the same manner as Example 1.

Results were listed in Table 6.

TABLE 6

| Ink set | | Evaluation results Abrasion resistance | Adhesiveness | Ejection | Repelling | Dot diameter | Storage stability | Remarks |
|---|---|---|---|---|---|---|---|---|
| Ink set 1 | Y-101 | A | A | A | A | A | A | Inv. |
|  | M-101 | A | A | A | A | A | A |  |
|  | C-101 | A | A | A | A | A | A |  |
|  | K-101 | A | A | A | A | A | A |  |
| Ink set 2 | Y-102 | D | D | B | A | A | A | Comp. |
|  | M-102 | D | D | B | A | A | A |  |
|  | C-102 | D | D | B | A | A | A |  |
|  | K-102 | D | D | B | A | A | A |  |
| Ink set 3 | Y-103 | A | A | A | B | C | D |  |
|  | M-103 | A | A | A | B | C | D | Comp. |
|  | C-103 | A | A | A | B | C | D |  |
|  | K-103 | A | A | A | B | C | D |  |

Inv.: Inventive Example,
Comp.: Comparative Example

The results described in Table 6 clearly show that each of the inks of the present invention exhibits excellent performances such as abrasion resistance and adhesiveness in case of printing onto polyvinylchloride as recording medium, as well as ink ejection, repelling and dot diameter at image forming, and further small change of the surface tension during ink storage, compared to the comparative inks.

What is claimed is:

1. An inkjet ink which is an aqueous inkjet ink suitable for use with a non-absorptive recording medium, the inkjet ink comprising water, a pigment, a water-soluble resin, a water-soluble organic solvent, and a surfactant, wherein the water-soluble resin is a copolymer resin which has an acid number of not less than 50 and not more than 130 mgKOH/g, a glass transition temperature (Tg) of not less than 30° C. and not more than 100° C., and a weight-average molecular weight (Mw) of not less than 20,000 and not more than 80,000, and which is synthesized from a first monomer component that consists of only methyl methacrylate, and an alkyl acrylate and/or alkyl methacrylate, and a second monomer component that consists of an acid monomer, and in which the total mass of methyl methacrylate and the alkyl acrylate or alkyl methacrylate is not less than 80 and not more than 95% relative to the total mass of all of the monomers constituting the copolymer resin and a content of the copolymer resin is not less than 3% by mass based on total ink mass and not more than 15% by mass based on total ink mass; and the surfactant comprises a fluorochemical surfactant and a polyoxyethylene alkyl ether.

2. The inkjet ink of claim 1, wherein a carbon number of an alkyl group in the alkyl acrylate is not less than 2 and not more than 8, and the acid monomer is acrylic acid or methacrylic acid.

3. The inkjet ink of claim 1, wherein a carbon number of an alkyl group in the alkyl methacrylate is not less than 2 and not more than 8, the first monomer component comprises alkyl methacrylate, and the acid monomer is acrylic acid or methacrylic acid.

4. The inkjet ink of claim 1, wherein a mass ratio of the copolymer resin based on the pigment is not less than 1 and not more than 20.

5. The inkjet ink of claim 1, wherein the fluorochemical surfactant is a surfactant having a straight or a branched perfluoro alkyl group or a perfluoro alkenyl group, and a carbon number of a main chain of the perfluoro alkyl group or the perfluoro alkenyl group is not less than 3 and not more than 6.

6. The inkjet ink of claim 1 comprising amines having a boiling point of not less than 100° C. and not more than 200° C. in an amount of not less than 0.1% by mass and not more than 1% based on the inkjet ink.

7. An inkjet recording method comprising steps of:

printing the inkjet ink of claim 1 on a non-absorptive recording medium which is heated at not less than 35° C. and not more than 60° C., and heat-drying a printed matter at not less than 50° C. and not more than 90° C.

8. The inkjet ink of claim 1, wherein the copolymer resin consists of a first monomer component that consists of methyl methacrylate, and an alkyl acrylate and/or alkyl methacrylate, and a second monomer component that consists of an acid monomer.

* * * * *